(No Model.)

E. E. SCOTT.
APPARATUS FOR RAISING OR LOWERING WAGON BODIES.

No. 442,460. Patented Dec. 9, 1890.

Witnesses:
E. P. Ellis
J. M. Nesbit

Inventor:
E. E. Scott
per Lehmann & Pattison, atty

UNITED STATES PATENT OFFICE.

EUGENE EDWARD SCOTT, OF WHITESBOROUGH, TEXAS.

APPARATUS FOR RAISING OR LOWERING WAGON-BODIES.

SPECIFICATION forming part of Letters Patent No. 442,460, dated December 9, 1890.

Application filed June 27, 1890. Serial No. 356,975. (No model.)

*To all whom it may concern:*

Be it known that I, EUGENE EDWARD SCOTT, of Whitesborough, in the county of Grayson and State of Texas, have invented certain new and useful Improvements in Apparatus for Raising or Lowering Wagon-Bodies; and I do hereby declare the following to be a full, clear, and exact description of the invention, such as will enable others skilled in the art to which it pertains to make and use it, reference being had to the accompanying drawings, which form part of this specification.

My invention relates to an improvement in wagon-body raisers; and it consists in the construction and arrangement of parts, which will be fully described hereinafter.

The object of my invention is to provide a wagon-bed raiser by means of which the bed can be raised and supported in a raised position by means of the construction hereinafter specified.

Figure 1:
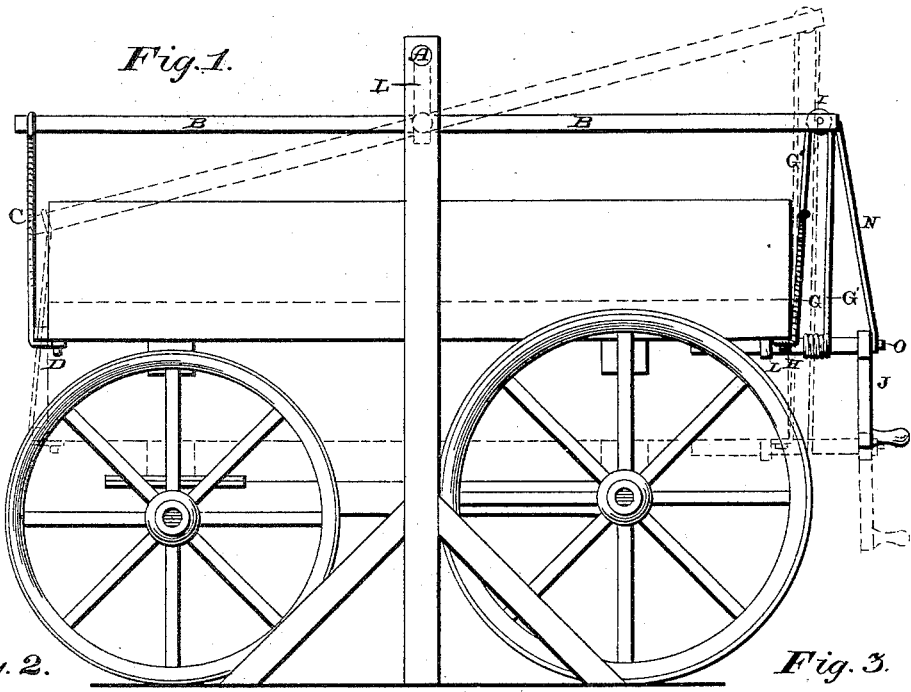
Figure 2:
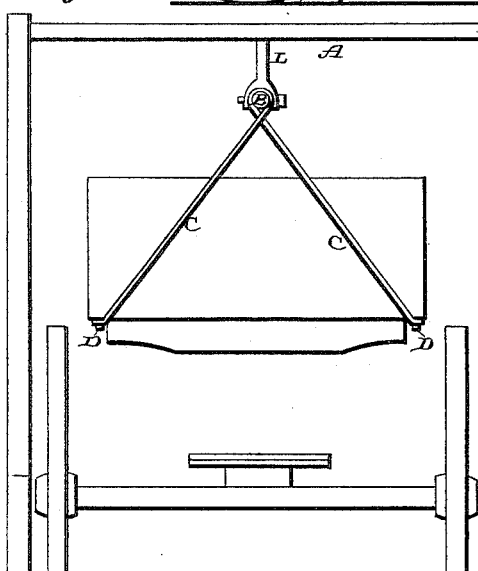
Figure 3:
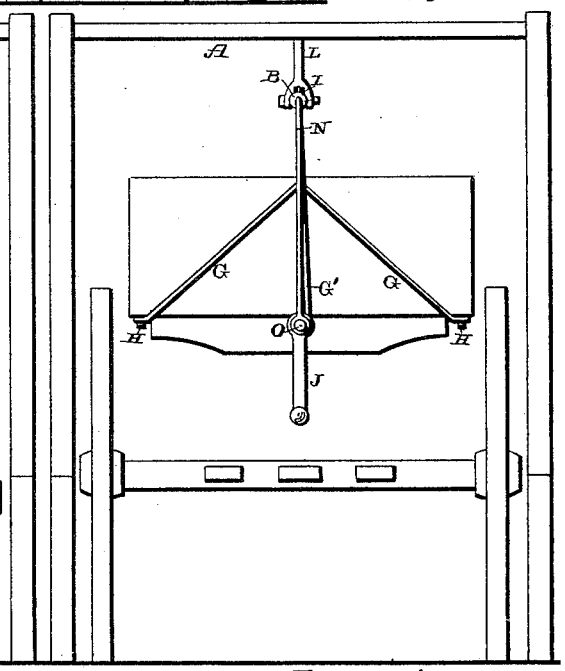

Figure 1 is a side elevation of my invention, the wagon being also shown. Fig. 2 is a front view. Fig. 3 is a rear view.

A represents a rod, which is preferably placed upon posts, as here shown, but which may be supported by the frame-work of a barn or carriage-house, if so desired. Pivotally suspended from the outer end of the rod A is a bar B, in one end of which is journaled a roller I. This bar B is preferably longer than the vehicle-body, and has attached to the opposite end from the roller I the cords or wires C, which have their ends catch upon the projections D, secured to the under side of the front end of the body. Secured to the opposite end of the body are the cords or wires G, which have their lower ends to catch upon the projections H at the under side of the rear end of the body. The upper ends of these cords are secured to one end of the cord G', which passes over the roller I and has its opposite end wrapped around a shaft O, upon the outer end of which the handle J is placed. A staple L is secured to the under side of the body, and through this staple the inner end of the shaft O passes, and which forms a journal therefor.

Secured at its upper end to the rear end of the rod A is a rod N, the lower end of which detachably passes around the outer end of the shaft O, as shown.

When it is desired to raise the body, the front end of the rod B is lowered, as shown in dotted lines in Fig 1, and the cords C attached to the projections D. The lower ends of the cords G are then attached to the projections H at the opposite end of the body, and by revolving the shaft the body is elevated. When the body reaches the position shown in solid lines in Fig. 1, the lower end of the rod N is placed over the outer end of the shaft O, which will hold the rear end of the body in an elevated position when the handle is released.

Having thus described my invention, I claim—

1. In a wagon-body raiser, the combination of vertical supports, a lever pivotally supported therefrom between its ends and having a roller in one end, a shaft adapted to be secured to one end of the body, a cord having one end connected with the same end of the body as the shaft and passing over the roller and its opposite end attached to the shaft, and a cord attached to the opposite end of the body and to the adjacent end of the lever, substantially as shown and described.

2. In a wagon-body raiser, the combination of the two vertical supports, a rod connecting their upper ends, a hanger depending from the center thereof, a lever pivoted between its ends in the lower end of the said hanger, a roller in one end of the said lever, a shaft adapted to be journaled upon the body, a cord having one end connected with the same end of the body as the shaft and passing over the roller and its opposite end attached to the shaft, and a cord attached to the opposite end of the body and to the adjacent end of the lever, substantially as shown and described.

In testimony whereof I affix my signature in presence of two witnesses.

EUGENE EDWARD SCOTT.

Witnesses:
JEFF. DAVIS CURTIS,
ADOLPHUS SCOTT.